US012502334B2

(12) United States Patent
Yong

(10) Patent No.: US 12,502,334 B2
(45) Date of Patent: Dec. 23, 2025

(54) CONNECTOR ASSEMBLY AND MANUFACTURING PROCESS OF THE SAME

(71) Applicant: Becton Dickinson Holdings Pte. Ltd., Singapore (SG)

(72) Inventor: Jimmy Yong, Singapore (SG)

(73) Assignee: Becton Dickinson Holdings Pte. Ltd., Singapore (SG)

(*) Notice: Subject to any disclaimer, the term of this patent is extended or adjusted under 35 U.S.C. 154(b) by 328 days.

(21) Appl. No.: 18/278,540

(22) PCT Filed: Feb. 21, 2022

(86) PCT No.: PCT/SG2022/050083

§ 371 (c)(1),
(2) Date: Aug. 23, 2023

(87) PCT Pub. No.: WO2022/182289

PCT Pub. Date: Sep. 1, 2022

(65) Prior Publication Data

US 2024/0293286 A1 Sep. 5, 2024

(30) Foreign Application Priority Data

Feb. 26, 2021 (EP) .................................... 21159705

(51) Int. Cl.
*A61J 1/20* (2006.01)

(52) U.S. Cl.
CPC ............ *A61J 1/2048* (2015.05); *A61J 1/201* (2015.05); *A61J 1/2096* (2013.01)

(58) Field of Classification Search
CPC ........ A61J 1/2048; A61J 1/201; A61J 1/2096; A61J 1/2055; A61J 1/2065; A61M 39/12; A61M 2039/1027; A61M 5/162; A61M 5/1626
See application file for complete search history.

(56) References Cited

U.S. PATENT DOCUMENTS

| | | | |
|---|---|---|---|
| 5,976,115 A | 11/1999 | Parris et al. | |
| 8,512,309 B2 | 8/2013 | Shemesh et al. | |
| 10,426,703 B2 | 10/2019 | Russo et al. | |

(Continued)

FOREIGN PATENT DOCUMENTS

| | | | |
|---|---|---|---|
| AU | 2011212618 B2 * | 10/2015 | ............. A61J 1/201 |
| CN | 102821735 A | 12/2012 | |

(Continued)

*Primary Examiner* — Susan S Su

(74) *Attorney, Agent, or Firm* — The Webb Law Firm

(57) ABSTRACT

A connector assembly disclosed herein includes a male part and a female part. The female part includes a cylindrical body extending about a central axis, a fitting portion configured to be sealingly fitted to a medical injection device, and a spike. An annular gap is formed between the cylindrical body and the spike to at least partly accommodate the male part. The female part further includes at least two ribs formed on an inner surface of the cylindrical body and protruding radially inwardly. Each ribs extends straight in parallel to the central axis and has an innermost fitting surface configured to be detachably fitted to corresponding threaded portions of the male part.

10 Claims, 12 Drawing Sheets

(56) References Cited

U.S. PATENT DOCUMENTS

| | | | | |
|---|---|---|---|---|
| 2003/0107628 | A1 * | 6/2003 | Fowles ................. | A61J 1/2089 347/86 |
| 2009/0069783 | A1 * | 3/2009 | Ellstrom ............... | A61J 1/2089 604/414 |
| 2014/0265319 | A1 | 9/2014 | Clark et al. | |
| 2019/0234540 | A1 | 8/2019 | Marici et al. | |

FOREIGN PATENT DOCUMENTS

| | | | |
|---|---|---|---|
| CN | 109751301 | A | 5/2019 |
| CN | 110062664 | A | 7/2019 |
| CN | 112105328 | A | 12/2020 |
| WO | 2019219383 | A1 | 11/2019 |

* cited by examiner

CONNECTOR ASSEMBLY AND MANUFACTURING PROCESS OF THE SAME

CROSS-REFERENCE TO RELATED APPLICATIONS

This application is the United States national phase of International Application No. PCT/SG2022/050083 filed Feb. 21, 2022, and claims priority to European Patent Application No. 21159705.9 filed Feb. 26, 2021, the disclosures of which are hereby incorporated by reference in their entireties.

BACKGROUND OF THE INVENTION

Field of the Invention

The present invention relates to a connector assembly comprising a male part and a female part to be fitted to each other. The present invention also relates to a process for manufacturing such a connector assembly.

Description of Related Art

A variety of types of connectors for connecting two medical components to each other are known and available. For example, WO 2019/219383 discloses a connector for connecting a medical injection device to a container by screwing a sleeve of the injection device into the connector at one end and connecting a container to the connector at the other end.

There are also luer lock systems comprising a male part and a female part, which are respectively provided with continuous threaded portions in order to securely connect the two parts by screwing via the threaded portions.

Male and female parts of such luer lock connectors can be produced by molding. However, because of the threaded portions to be formed on the respective parts, rotational de-molding is carried out. Also, those threaded portions result in the mold becoming complex in structure and thus the connectors becoming expensive. Furthermore, a vulnerable portion of the parts to be molded could be damaged in the de-molding process involving rotational motion of the mold core. This is in particular the case when the female part comprises a spike, which is a pointed hollow projection configured to pierce a septum of a container. The spike comprises a lateral opening at its pointed tip in order to create a fluidic connection between a medical injection device attached to the luer lock connector and the container. Due to the presence of said opening, the tip of the spike may be damaged (e.g. torn off) when a rotational de-molding is carried out.

SUMMARY OF THE INVENTION

In view of the disadvantages of the connectors described above, the present application discloses a connector assembly as defined in the appended claims.

Specifically, there is herein disclosed a connector assembly comprising a male part and a female part, wherein the male part comprises a tubular male body extending about a central axis, the male body including at least two threaded portions formed on an outer surface of the male body and circumferentially spaced apart from each other about the central axis, and wherein the female part comprises: a hollow cylindrical body extending about the central axis; a proximal fitting portion configured to be sealingly fitted to a medical injection device; and a spike extending distally from the proximal fitting portion about the central axis and defining an annular gap between the cylindrical body and the spike about the central axis, the annular gap being configured to at least partly accommodate the male body of the male part, and wherein the female part further comprises at least two ribs formed on an inner surface of the cylindrical body and protruding radially inwardly, the ribs extending straight in parallel to the central axis, the rib having an innermost fitting surface configured to be detachably fitted to the corresponding threaded portions of the male part. The connector assembly may be configured as a luer lock connector assembly.

Thanks to the straight shape of the ribs, the female part can be de-molded without any rotation of the mold components, thereby eliminating the risk of damaging the spike during the de-molding.

Each of the ribs of the female part may have the fitting surface extending inclined with respect to the central axis so that a distance between the fitting surface and the central axis increases toward the proximal fitting portion. Each of the threaded portions of the male part may extend inclined with respect to the central axis so as to be fitted to the corresponding rib of the female part.

Each of the ribs of the female part and each of the threaded portions of the male part may extend at an angle of 2 degrees or smaller with respect to the central axis of the spike.

The female part may comprise three or four ribs equally spaced about the central axis.

At least one of the threaded portions may comprise a turn limit protruding radially outwardly and configured to prevent further rotation of the male part relative to the female part when the threaded portions are fitted to the ribs of the female part.

At least one of the threaded portions may comprise an indentation depressed radially inwardly and configured to releasably lock fitting between the female part and the male part.

Each of the threaded portions of the male part may comprise a thinner portion and a thicker portion arranged adjacent to the thinner portion about the central axis and being thicker than the thinner portion so as to protrude radially outwardly farther than the thinner portion.

Each of the ribs of the female part may comprise a thinner portion and a thicker portion arranged adjacent to the thinner portion about the central axis and being thicker than the thinner portion so as to protrude radially inwardly farther than the thinner portion.

The female part may be configured to be sealingly connected to a medical injection device having a needle, the spike defining an inner channel configured to accommodate the needle, the female part further comprising a skirt extending distally from the cylindrical body and beyond a tip of the spike.

There is also disclosed a manufacturing process for manufacturing the connector assembly having the above-described configuration. According to this process, the female part is formed by a mold comprising a first mold component and a second mold component, wherein de-molding of the female part is carried out by translating the first component relative to the second component along the central axis.

According to the connector assembly disclosed herein, the female part comprises no threaded portion but comprises the straight ribs to be fitted with the threaded portions of the male part. This eliminates a need of rotational motion of a mold core to produce the female part during de-molding process. Since the female part can be simply de-molded by straight pulling motion of the mold core along the central axis, the number of cavities per mold can be increased and the manufacturing cost of the connector assembly can be substantially reduced.

BRIEF DESCRIPTION OF THE DRAWINGS

Embodiments of the invention will be described in further detail with reference to the accompanying drawings, in which.

DESCRIPTION OF THE INVENTION

Figure 1:
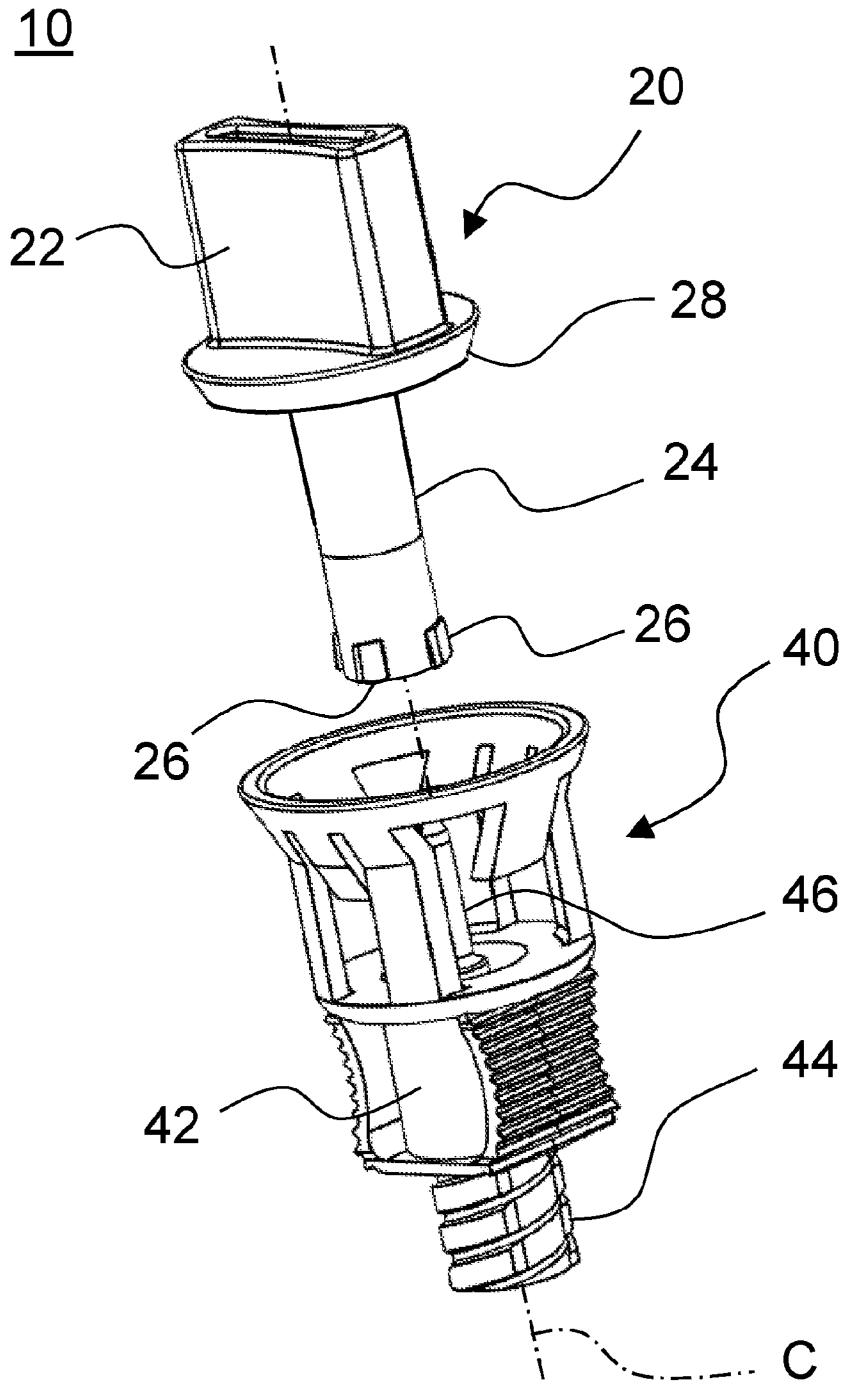
FIG. 1 is an exploded perspective view showing a connector assembly comprising a male part and a female part to be fitted together.

FIG. 1 is an exploded perspective view of a connector assembly 10. The assembly 10 comprises a male part 20 and a female part 40 to be fitted together. The male part 20 comprises a tubular male body 24 extending about a central axis C. The male body 24 is configured to be inserted into the female part 40 and detachably attached to the female part 20, thereby forming a fitting.

The female part 40 comprises a spike 46 extending about the central axis C. The spike 46 defines an inner channel that may be configured to accommodate a needle of a medical injection device, such as a syringe (not shown). The male part 20 is in the form of a cap in order to sealingly cover the spike 46 of the female part 40 so that when a medical injection device is attached to the female part 40, a needle of the medical injection device can be protected from possible contamination and/or a needle stick injury can be prevented.

Figure 2:
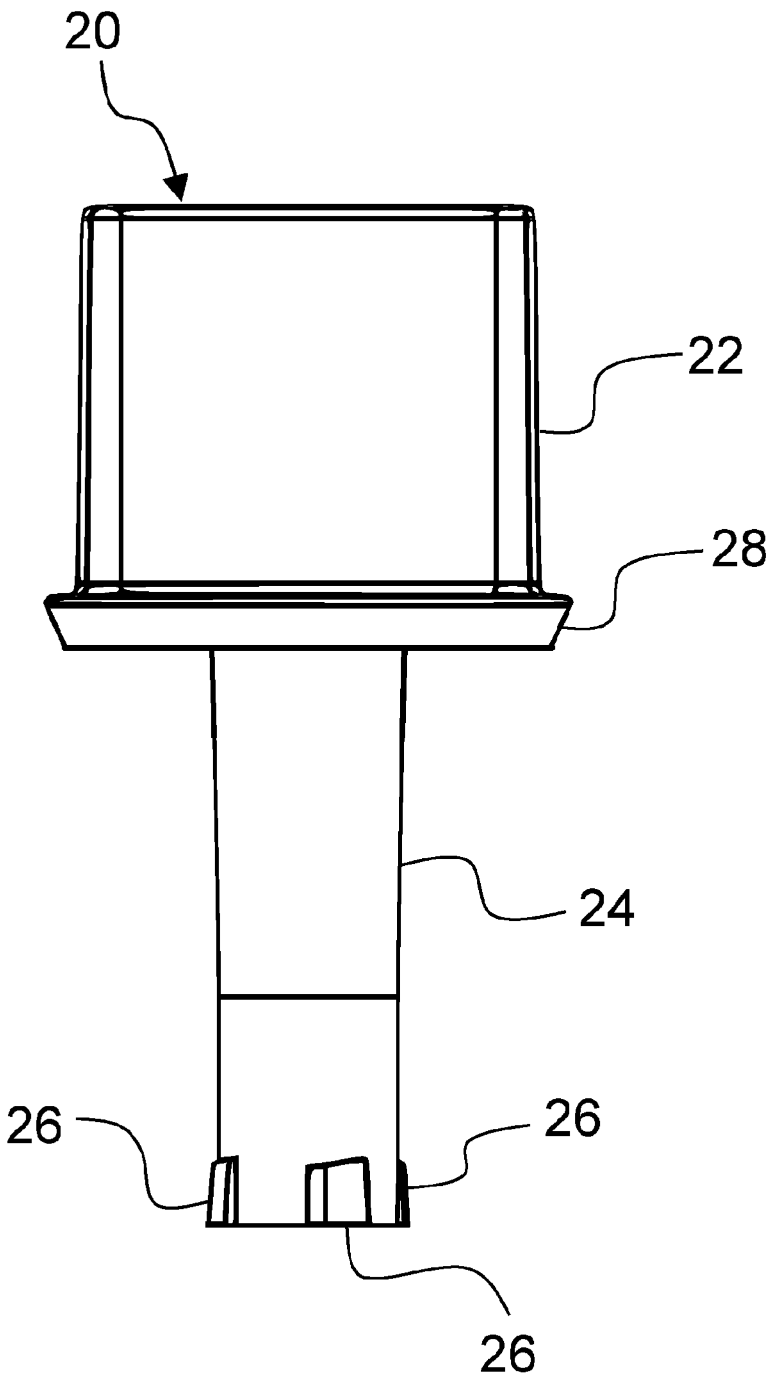
FIG. 2 is a side view showing the male part.
Figure 3:
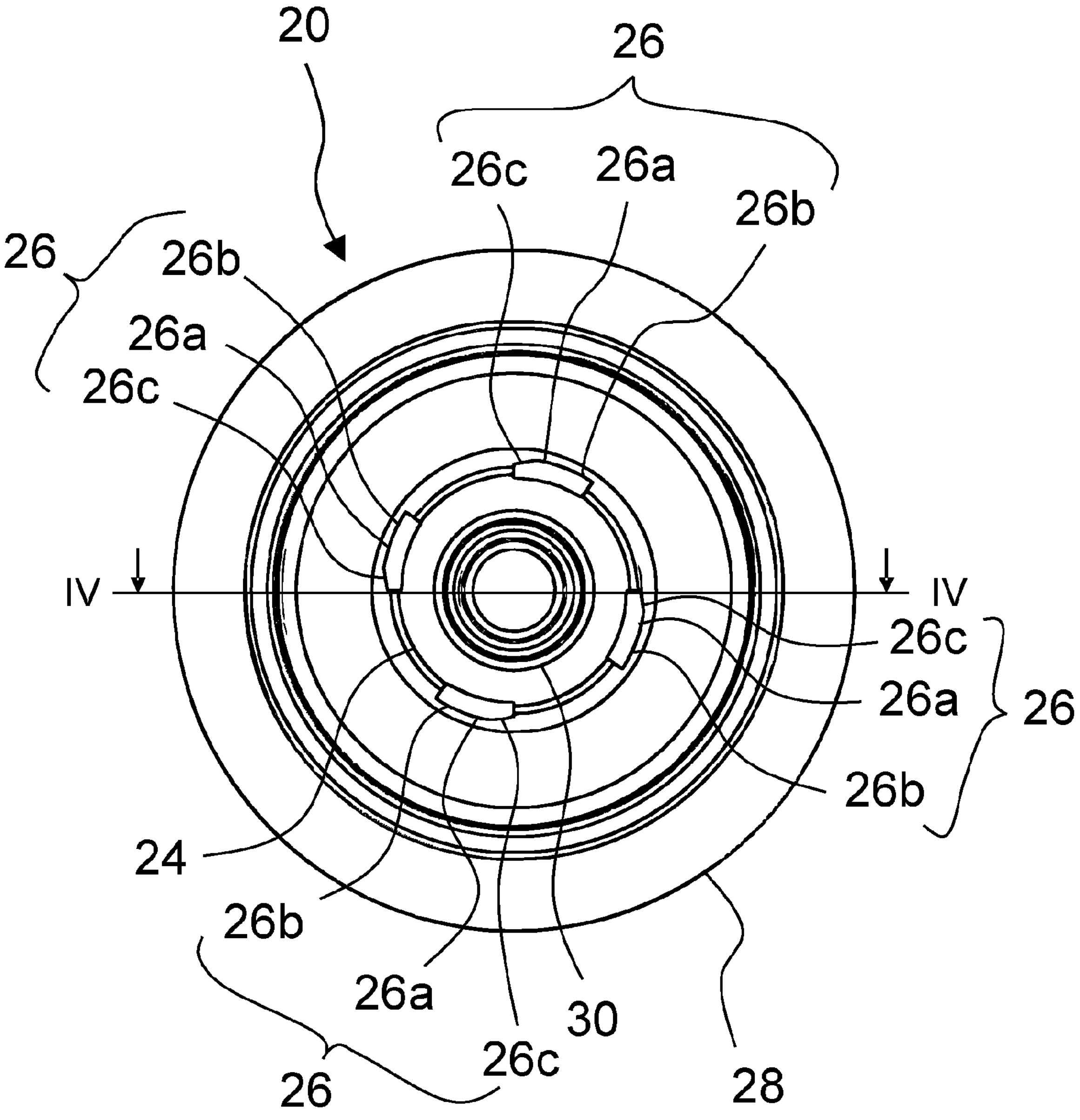
FIG. 3 is a bottom view showing the male part.
Figure 4:
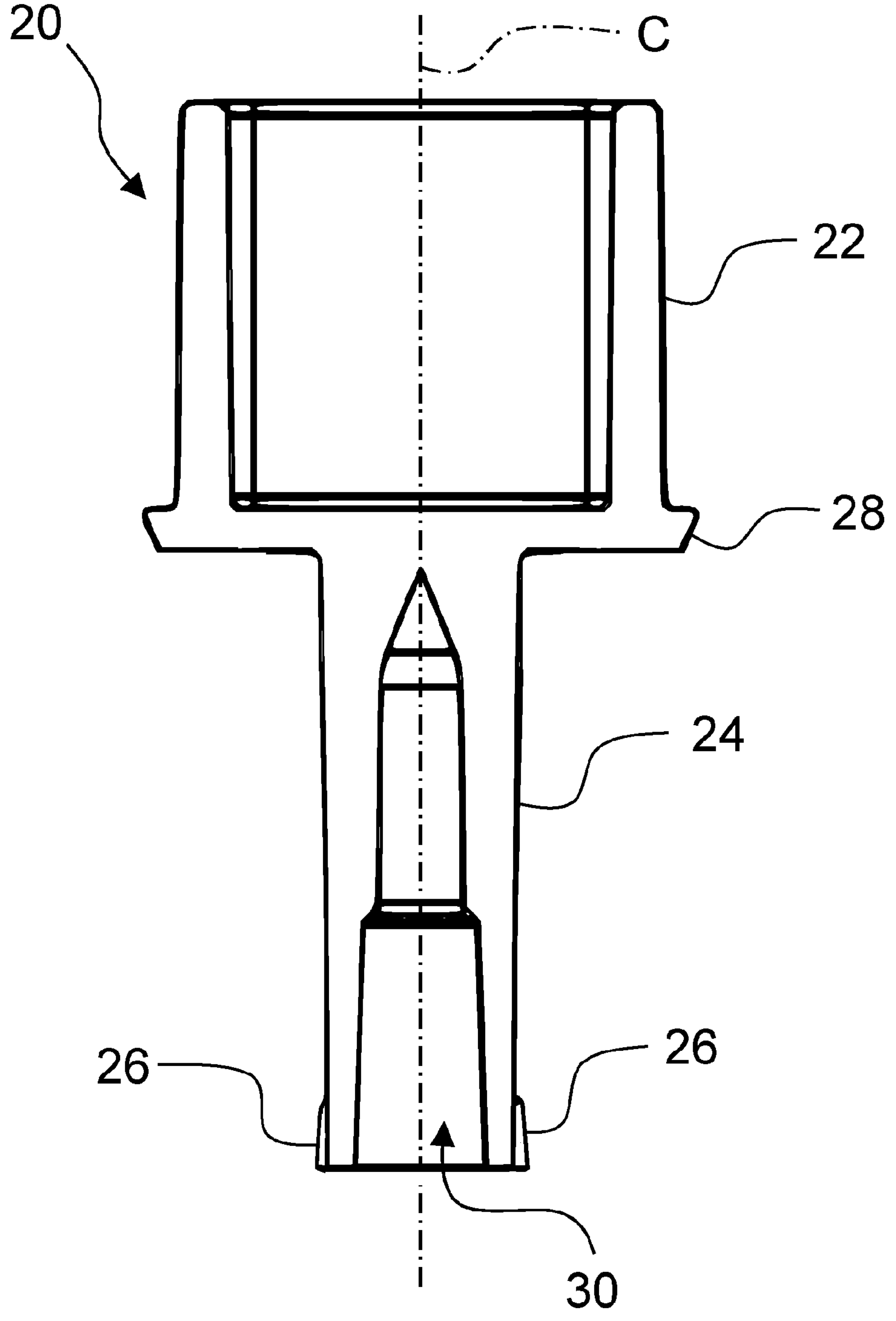
FIG. 4 is a longitudinal section view showing the male part taken along line IV-IV of FIG. 3.

The configuration of the male part 20 will be described in more detail with reference to FIGS. 2 to 4. FIG. 2 is a side view showing the male part 20. FIG. 3 is a bottom view of the male part 20 seen from a tip of the male body 24, i.e., from the proximal end of the male part 20. FIG. 4 is a longitudinal section view showing the male part taken along with line IV-IV of FIG. 3. Hereinafter the expression "proximal" may be used to refer to being closer to a medical injection device to be attached to the female part 40, while the expression "distal" may be used to refer to being away from the medical injection device.

The male part 20 also comprises a collar 28 provided at a distal end of the male body 24 and a tab 22 extending distally from the collar 28. The tab 22 may be a hollow element having an elongated cylindrical shape. The tab 22 is configured to allow the male part 20 to be firmly held by a user. The collar 28 generally has a disk shape and connects the tab 22 and the male body 24 to each other. The collar 28 has a greater diameter than the diameter of the male body 24. The collar 28 may be delimited by a tapered rim having a decreasing diameter toward the proximal end of the male part 20. The dimensions and shapes of the collar 28, the tab 22, and the tapered rim may be adjusted according the needs of the skilled person.

The male body 24 defines an inner cavity 30 about the central axis C. The cavity 30 opens at a proximal end of the male body 24 and configured to accommodate the spike 46 of the female part 40 when the male part 20 is fitted onto the female part 40. The cavity 30 is closed on the opposite end, thereby preventing the spike 46 of the female part 40 and therefore a needle of a medical injection device—if any—from being contaminated. This also enables to protect the spike and the needle during storage and/or transport.

The male part 20 also comprises at least two threaded portions 26 on an outer circumferential surface of the male body 24. The threaded portions 26 are formed at a tip (i.e., the proximal end) of the male body 24 and circumferentially spaced apart from each other about the central axis C. The male part 20 may comprise four threaded portions 26 as shown in the illustrated embodiment. In the case of the four threaded portions 26 being formed, the threaded portions 26 are equally spaced from each other, or provided at a position at every 90° (90 degrees) about the central axis C. Nonetheless, the male part 26 may as well comprise three threaded portions, or five or more threaded portions.

The threaded portions 26 may be spiral protrusions that extend radially outwardly from the outer surface of the male body 24. Each threaded portion 26 may have a thinner portion 26*a* and a thicker portion 26*b* arranged adjacent to the thinner portion 26*a* about the central axis C. The thicker portion 26*b* is thicker than the thinner portion 26*a* and therefore protrudes radially outwardly from the male body 24 farther than the thinner portion 26*a*. The thinner portion 26*a* and the thicker portion 26*b* may be smoothly connected to each other in such a manner that the thickness gradually increases from the thinner portion 26*a* to the thicker potion 26*b*.

Alternatively, the thinner portion 26*a* and the thicker portion 26*b* may be connected to each other in such a manner that the thickness increases stepwise from the thinner portion 26*a* to the thicker portion 26*b*.

Optionally, the threaded portion 26 may also have a chamfered edge 26*c* adjacent to the thinner portion 26*a*.

The threaded portion 26 may extend inclined with respect to the central axis C so as to protrude farther radially outwardly at a given position than at a position closer to the distal end. The inclination angle of the threaded portion 26 is determined in accordance with a corresponding draft angle of the female part 40 as further explained below.

The threaded portions 26 may be flush with the most proximal surface of the male body 24. Alternatively, the threaded portions 26 may at least overpass the most proximal surface of the male body 24.

Figure 5:
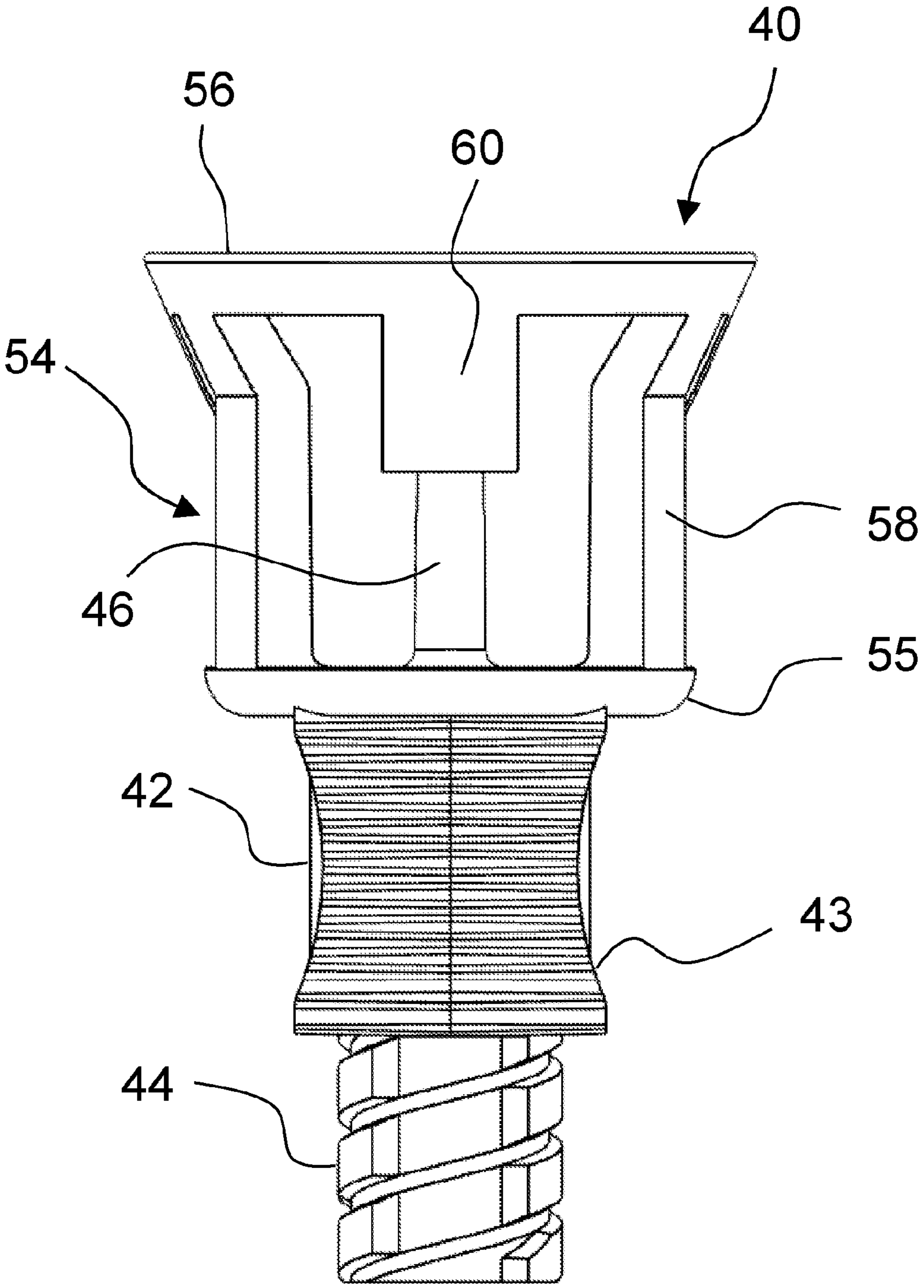
FIG. 5 is a side view showing the female part.
Figure 6:
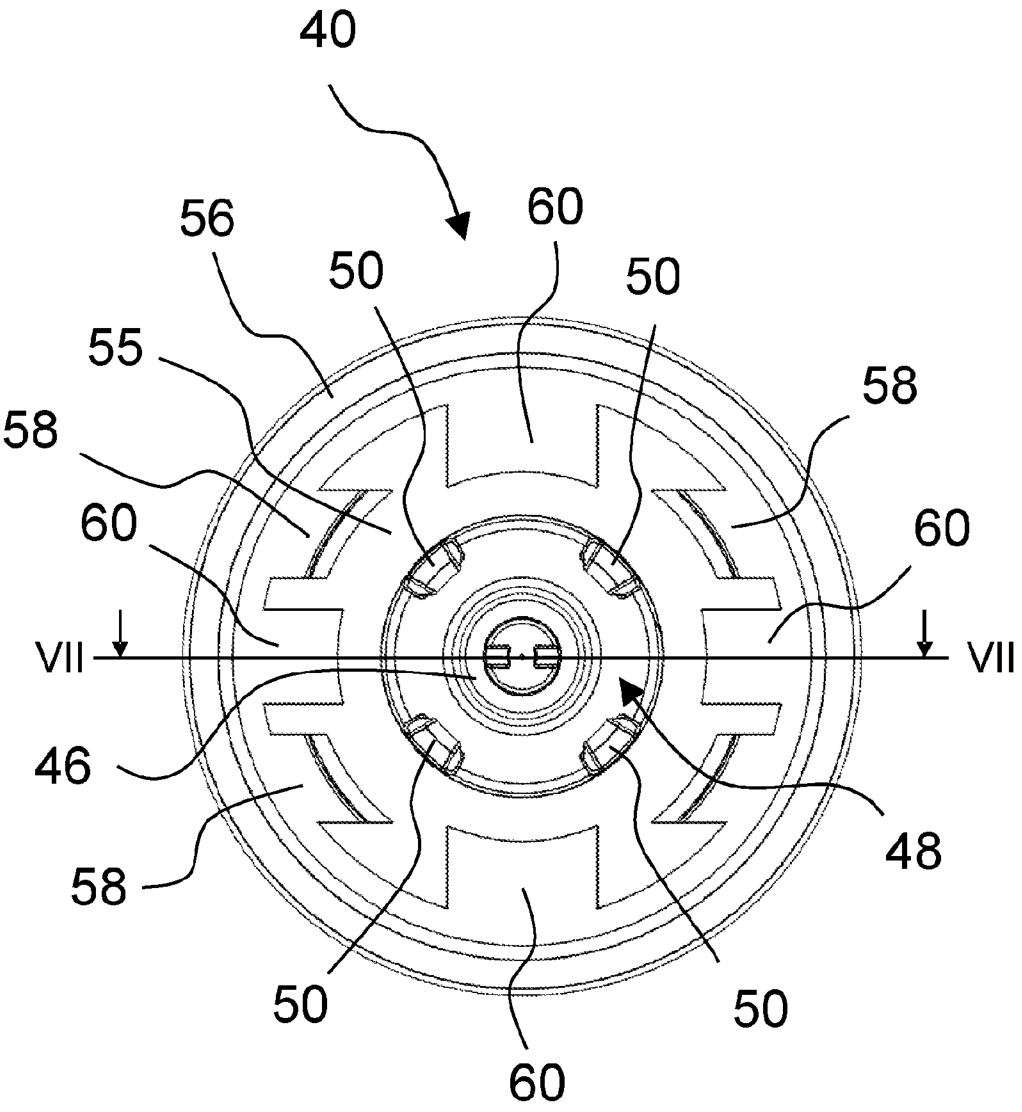
FIG. 6 is a top view showing the female part.
Figure 7:
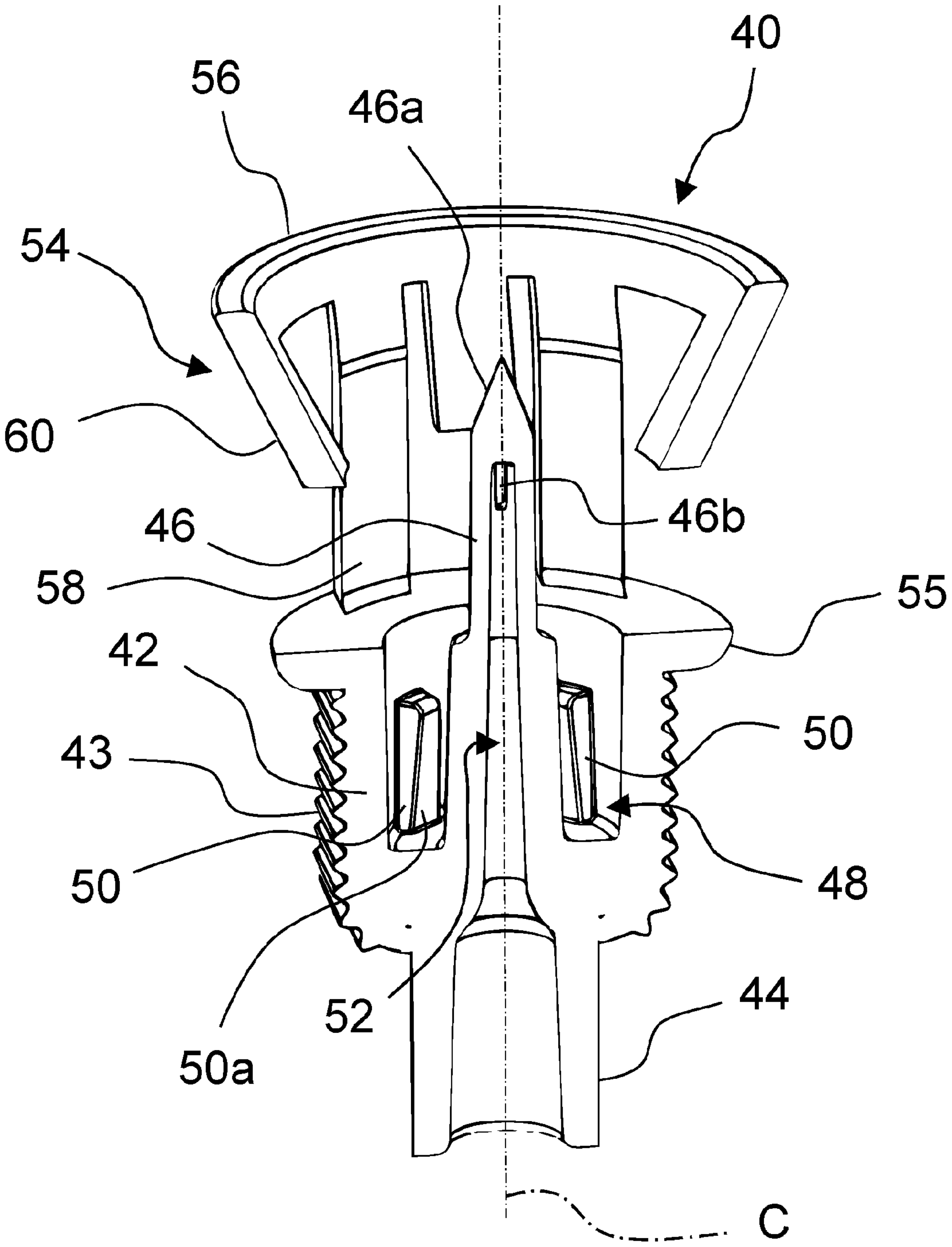
FIG. 7 is a perspective and section view showing the female part taken along line VII-VII of FIG. 6.

The configuration of the female part 40 is now described by referring to FIGS. 5 to 7. FIG. 5 is a side view showing the female part 40. FIG. 6 is a top view showing the female part 40, i.e., a view seen from the distal end of the female part 40. FIG. 7 is a perspective and section view showing the female part 40 taken along line VII-VII of FIG. 6.

The female part 40 comprises a hollow cylindrical body 42 extending about the central axis C, a proximal fitting portion 44 configured to be sealingly fitted to a medical injection device (not shown), and a spike 46 extending distally from the proximal fitting portion 44 about the central axis C.

The spike 46 defines an inner channel 52 extending about the central axis C and being configured to accommodate a needle of a medical injection device. The spike 46 is also provided at or near its pointed tip 46*a* with a lateral opening 46*b*. When a medical injection device is connected via the female part 40 to a container (not shown) such as a vial, the opening 46*b* provides fluid communication between the medical injection device and the container.

The female part 40 may also comprise a skirt 54 extending distally from the cylindrical body 42. The skirt 54 includes a ring 55 extending about the central axis C and provided at the distal end of the cylindrical body 42, a rim 56 also extending about the central axis C, a plurality of columns 58 connecting the ring 55 and the rim 56, a plurality of tongues 60 hanging down from the rim 56. The rim 56 encircles an opening configured to receive the collar 28 of the male part 20 when the male part 20 is fitted to the female part 40. The rim 56 may be situated at a position distally farther from the spike tip 46*a*. Since the skirt 54 extends beyond the tip 46*a*, the skirt 54 can protect the spike 46 and therefore a needle of a medical injection device. In another embodiment, however, the rim 56 may be situated at a position proximally farther from the spike tip 46*a*.

The female part 40 may also comprise an undulating portion 43 extending proximately from the ring 55. The undulating portion 43 is configured to give a firm grip to a user in handling the female part 40.

The female part 40 defines an annular gap 48 between the cylindrical body 42 and the spike 46 about the central axis C. The annular gap 48 is configured to accommodate the male body 24 of the male part 20.

The female part 40 also comprises at least two ribs 50 formed on an inner surface of the cylindrical body 42. The ribs 50 protrude radially inwardly from the cylindrical body 42. The ribs 50 extend straight in parallel to the central axis C. In other words, the rib 50 has a non-threaded, non-spiral configuration.

The rib 50 has an innermost fitting surface 50*a* configured to be detachably fitted to one of the threaded portions 26 of the male part 20. The fitting surface 50*a* may extend inclined with respect to the central axis C so that a distance between the fitting surface 50*a* and the central axis C increases toward the proximal fitting portion 44 or toward the closed end of the annular gap 48. The inclination of the fitting surface 50*a* may be defined by an angle of between 0° (0 degree) and 2° (2 degrees) with respect to the central axis C. The draft angle of the fitting surface 50*a* of the rib 50 matches the inclination angle of the threaded portions 26 of the male part 20. In this way, the threaded portion 26 of the male part 20 can be fitted onto the corresponding rib 50 of the female part 40. The inclination angle of the fitting surface 50*a* may not be too steep in view of mass production. An appropriate angle may be determined by taking into account some factors such as material properties of the female part 40, the width and the length of the rib 50.

Hereafter the process of fitting the male part 20 onto the female part 40 will be described.

As shown in FIG. 1, the male part 20 is brought in alignment with the female part 40 with respect to the central axis C. The male part 20 is then moved toward the female part 40 along the central axis C, whereby the male body 24 is inserted into the annular gap 48 of the female part 40 (see FIG. 8). Owing to the spike 46 of the female part 40 and the corresponding cavity 30 of the male part 20, the central alignment between the two parts can be easily established.

Figure 8:
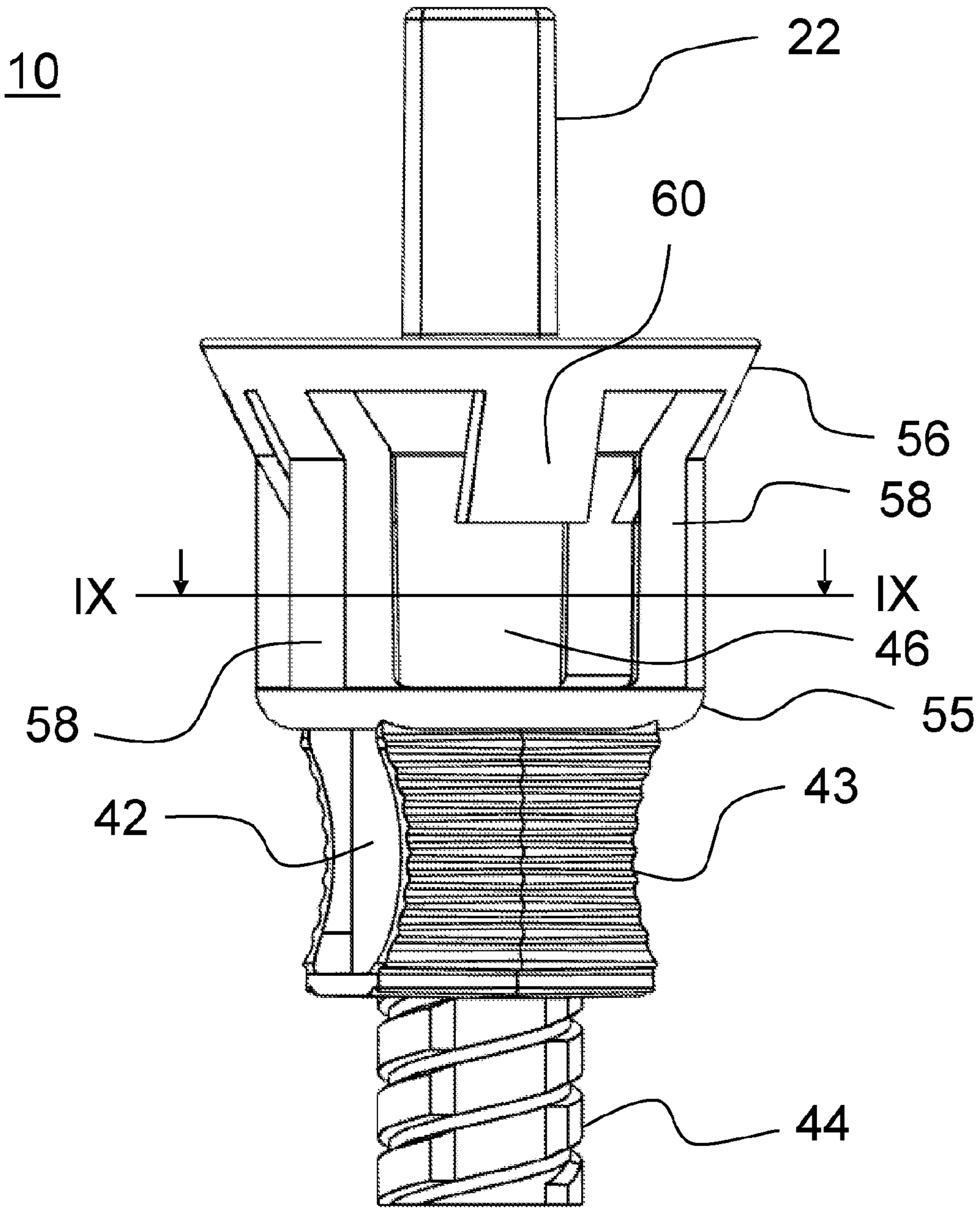
FIG. 8 is a side view showing the connector assembly in a state where the male part and the female part are fitted together.
Figure 9A:
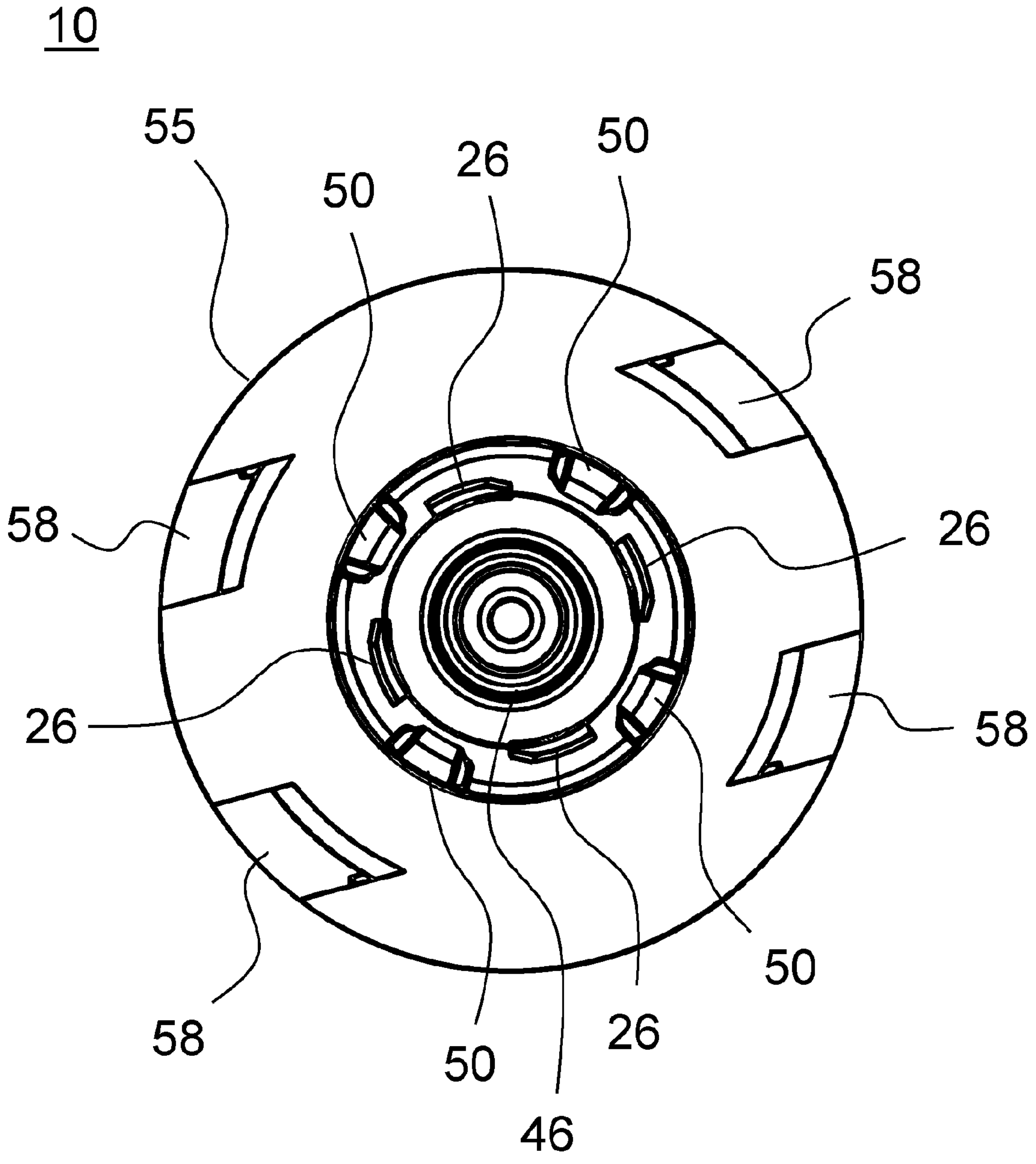
FIGS. 9A to 9C are section views taken along line IX-IX of FIG. 8, showing a fitting process of the male part onto the female part.

As shown in FIGS. 8 and 9A, once the male body 24 is fully inserted and the collar 28 of the male part 20 is received by the rim 56 of the female part 40, the threaded portions 26 are in position to be engaged with the ribs 50. The threaded portions 26 may be configured not to come in contact with the end of the annular gap 58 at the fully inserted position.

Figure 9B:
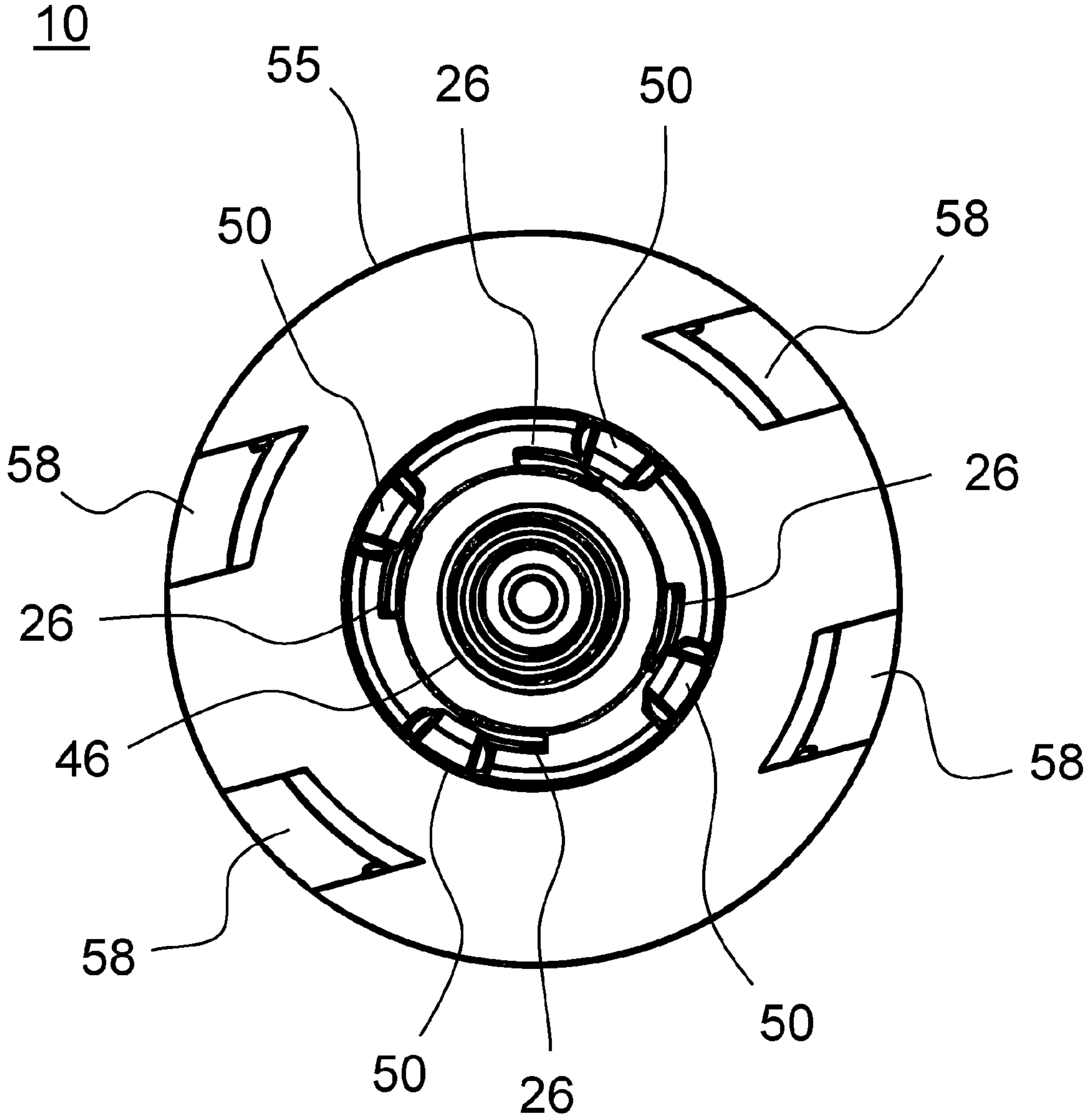

The male part 20 is then rotated about the central axis C relative to the female part 40 until the chamfered edges 26*c* of the threaded portions 26 are brought into contact with the corresponding ribs 50 of the female part 40 (see FIG. 9B). The chamfered edges 26*c* of the threaded portions 26 facilitate engagement between the threaded portions 26 and the corresponding ribs 50.

Figure 9C:
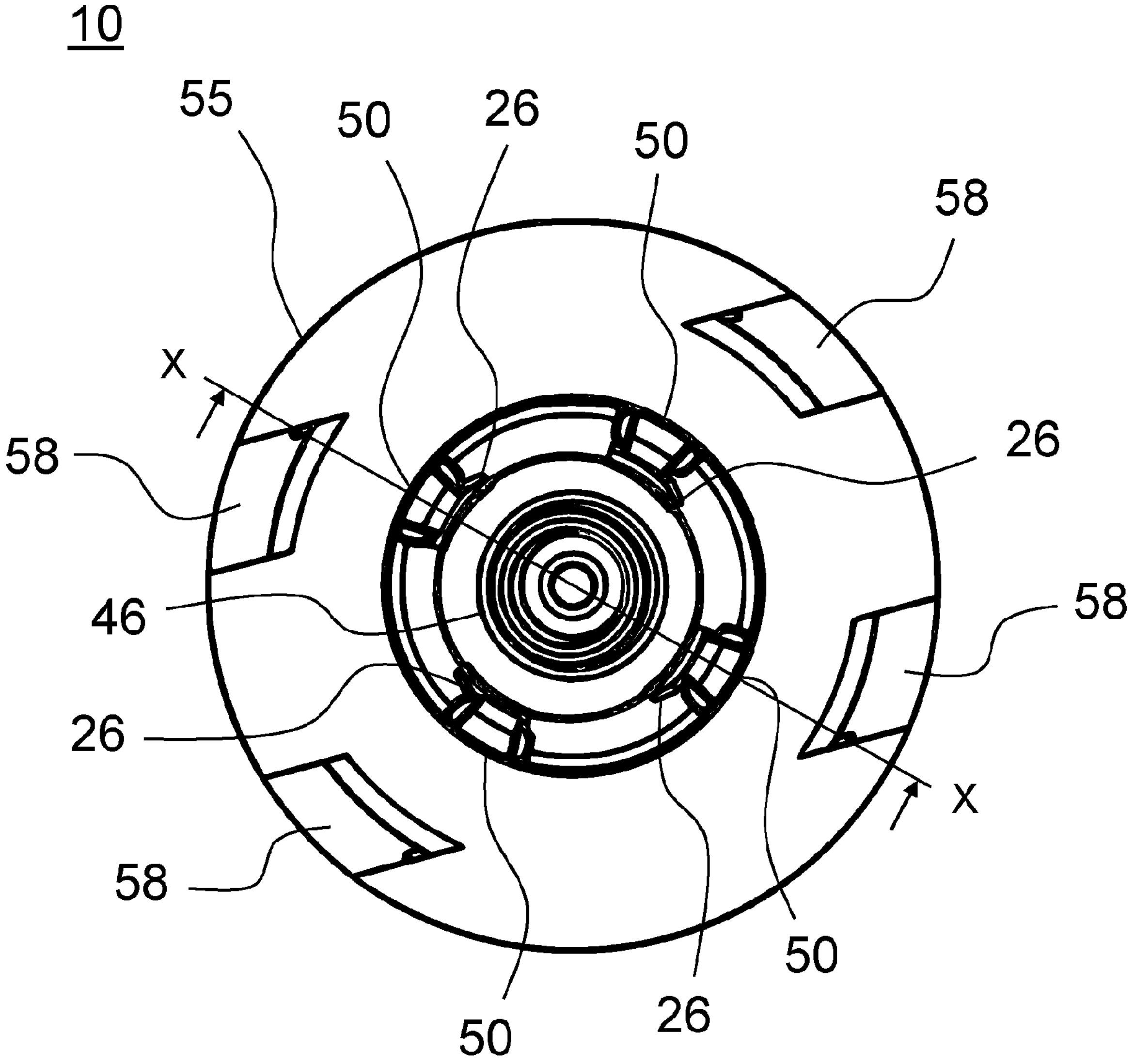
Figure 10:
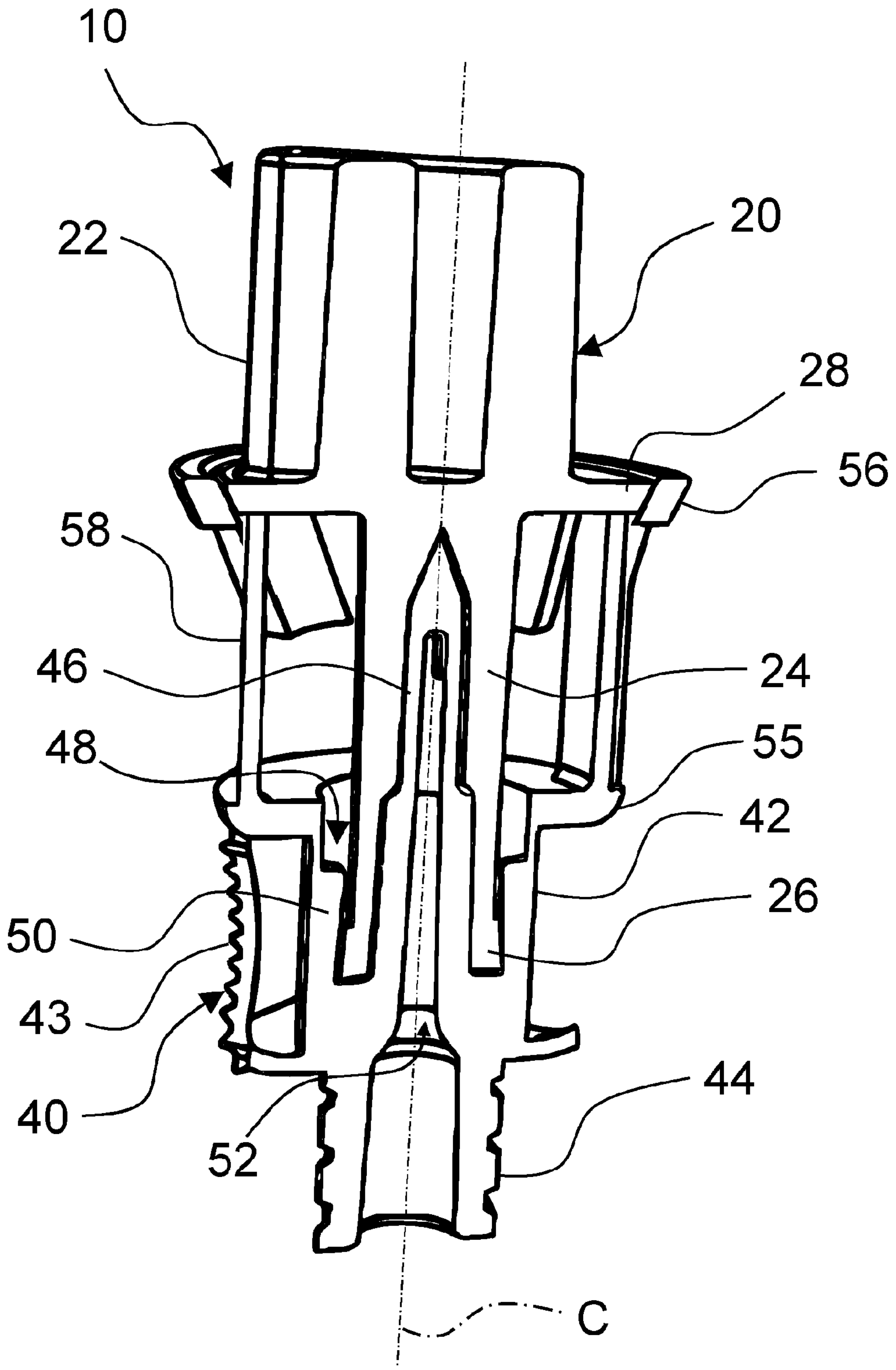
FIG. 10 is a perspective and section view taken along line X-X of FIG. 9C, showing the connector assembly in a state where the male part and the female part are fitted together.

The male part 20 is further rotated about the central axis C relative to the female part 40 such that the thicker portions 26*b* of the threaded portions 26 are fully fitted onto the corresponding ribs 50 of the female part 40 (see FIGS. 9C and 10). Since the threaded portions 26 respectively have the thinner portions 26*a* and the thicker portions 26*b*, the threaded portions 26 act as a wedge, whereby fitting between the male part 20 and the female part 40 can become reliable yet releasable when needed.

Once the male part 20 and the female part 40 are fitted together, the spike 46 of the female part 40 is fully covered by the male part 20. Therefore, potential contamination through the spike 46 can be prevented during storage or handling of the connector assembly 10.

When the medical injection device is in use, for example, when the spike 46 is used to pierce a septum of a vial, the male part 20 is rotated about the central axis C in the opposite direction to detach the male part 20 from the female part 40, thereby exposing the spike 46 of the female part 40.

The male part 20 and the female part 40 may each be a single piece made of plastic, e.g., polypropylene, or any other suitable materials. It is to be noted that the female part 40 according to the present disclosure does not comprise a threaded portion near the spike 46 but the straight ribs 50. Therefore, the ribs 50 of the female part 40 as well as the spike 46 can be produced by molding without involving rotational de-molding of a mold core. For example, the de-molding of the female part 40 can be carried out by translating a first mold component (i.e., core) away from a second mold component (i.e., cavity) along the central axis C. The translational de-molding is made possible by the disclosed configuration, thereby decreasing the manufacturing cost.

This is in particular advantageous since rotational motion during de-molding could damage the spike of a female part provided with an opening for necessary fluid communication.

By avoiding the rotational de-molding, a simpler mold can be used to produce the female part 40. In addition, a simpler mold design allows a larger number of cavities to be used in the same molding process, thereby contributing to reduced manufacturing cost. It is also possible to reduce a molding cycle time.

As compared to known friction fit between a male part and a female part, the engagement between the straight ribs 50 and the threaded portions 26 according to the embodiment provides a secure lock between the two parts, thereby preventing the male part 20 from slipping off from the female part 40 by accident, e.g., during storage and/or transportation.

In addition, according to the embodiment, the male part 20 can be easily taken apart from the female part 40 by rotating the male part 20 around the central axis C, e.g., 45 degrees or less, and then pulling away from the female part 40. This ensures a smoother process and better user experience, as compared to the known friction fit, which requires pulling force sufficiently strong to overcome the friction between the male part and the female part.

In one embodiment, at least one of the threaded portions 26 may be provided with a turn limit for preventing further rotation of the male part 20 from the fully fitted position. For example, the turn limit protrudes radially outwardly farther than the thicker portion 26*b* of the threaded portion 26.

In another embodiment, at least one of the threaded portions 26 may be provided with an indentation depressed radially inwardly. By catching the corresponding rib 50 of the female part 40 by the indentation of the threaded portion 26, a user can receive a tactile feedback from the male part 20 when the threaded portions 26 reach the fitted positions where the male part 20 is fully fitted onto the female part 40. The indentation can also provide locking function, whereby the male part 20 can be prevented from being unintentionally detached from the female part 40 during handling, storage or transportation, while allowing the male part 20 to be easily detached from the female part 40 when needed.

In yet another embodiment, each rib 50 may have a thinner portion and a thicker portion, instead of the threaded portions 26 having the thinner portion 26*a* and the thicker portion 26*b*. The thicker portion of the rib 50 is configured to protrude radially inwardly farther than the thinner portion, thereby acting as a wedge for enforcing fitting between the male part 20 and the female part 40.

The present invention is not limited to the embodiments described above. The technical concept disclosed herein is applicable to other types of connector assemblies and provides the same advantages as explained above. In one embodiment, the connector assembly may be configured as a luer lock connector assembly.

The invention claimed is:

1. A connector assembly comprising a male part and a female part, wherein the male part comprises a tubular male body extending about a central axis, the male body including at least two threaded portions formed on an outer surface of the tubular male body and circumferentially spaced apart from each other about the central axis, and wherein the female part comprises:

a hollow cylindrical body extending about the central axis;

a proximal fitting portion configured to be sealingly fitted to a medical injection device; and a spike extending distally from the proximal fitting portion about the central axis and defining an annular gap between the cylindrical body and the spike about the central axis, the annular gap being configured to at least partly accommodate the male body of the male part, and wherein the female part further comprises at least two ribs formed on an inner surface of the cylindrical body and protruding radially inwardly, the ribs extending straight in parallel to the central axis, the ribs having an innermost fitting surface configured to be detachably fitted to the corresponding threaded portions of the male part.

2. The assembly according to claim 1, wherein each of the ribs of the female part has the fitting surface extending inclined at an angle with respect to the central axis so that a distance between the fitting surface and the central axis increases toward the proximal fitting portion and wherein each of the threaded portions of the male part extends inclined with respect to the central axis so as to be fitted to the corresponding rib of the female part.

3. The assembly according to claim 2, wherein the angle is 2 degrees or smaller with respect to the central axis.

4. The assembly according claim 1, wherein the female part comprises three or four ribs equally spaced about the central axis.

5. The assembly according to claim 1, wherein at least one of the threaded portions comprises a turn limit protruding radially outwardly and configured to prevent further rotation of the male part relative to the female part when the threaded portions are fitted to the ribs of the female part.

6. The assembly according to claim 1, wherein at least one of the threaded portions comprises an indentation depressed radially inwardly and configured to releasably lock fitting between the female part and the male part.

7. The assembly according to claim 1, wherein each of the threaded portions of the male part comprises a thinner portion and a thicker portion arranged adjacent to the thinner portion about the central axis and being thicker than the thinner portion so as to protrude radially outwardly farther than the thinner portion.

8. The assembly according to claim 1, wherein each of the ribs of the female part comprises a thinner portion and a thicker portion arranged adjacent to the thinner portion about the central axis and being thicker than the thinner portion so as to protrude radially inwardly farther than the thinner portion.

9. The assembly according to claim 1, wherein the female part is configured to be sealingly connected to a medical injection device having a needle, the spike defining an inner channel configured to accommodate the needle, the female part further comprising a skirt extending distally from the cylindrical body and beyond a tip of the spike.

10. A manufacturing process for manufacturing the assembly according to claim 1, wherein the female part is formed by a mold comprising a first mold component and a second mold component, wherein de-molding of the female part is carried out by translating the first component relative to the second component along the central axis.

* * * * *